(12) United States Patent
Tanaka et al.

(10) Patent No.: US 9,544,370 B2
(45) Date of Patent: Jan. 10, 2017

(54) DATA TRANSFERRING APPARATUS, DATA TRANSMISSION SYSTEM AND DATA TRANSMITTING METHOD

(71) Applicant: KABUSHIKI KAISHA TOSHIBA, Minato-ku, Tokyo (JP)

(72) Inventors: Shingo Tanaka, Kanagawa-ken (JP); Takahiro Yamaura, Kanagawa-ken (JP); Kensaku Yamaguchi, Kanagawa-ken (JP); Sunao Wada, Kanagawa-ken (JP); Yasuo Ohya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 540 days.

(21) Appl. No.: 14/020,974

(22) Filed: Sep. 9, 2013

(65) Prior Publication Data

US 2014/0012948 A1 Jan. 9, 2014

Related U.S. Application Data

(63) Continuation of application No. PCT/JP2012/057252, filed on Mar. 14, 2012.

(30) Foreign Application Priority Data

May 17, 2011 (JP) .................. 2011-110650

(51) Int. Cl.
*G06F 15/16* (2006.01)
*H04L 29/08* (2006.01)
*G06F 3/06* (2006.01)

(52) U.S. Cl.
CPC .......... *H04L 67/1097* (2013.01); *G06F 3/061* (2013.01); *G06F 3/067* (2013.01); *G06F 3/0643* (2013.01); *G06F 3/0658* (2013.01)

(58) Field of Classification Search
CPC ............ H04L 67/1097; H04L 29/08549; G06F 3/061; G06F 3/0638–3/964; G06F 17/30194–17/30203

See application file for complete search history.

(56) References Cited

U.S. PATENT DOCUMENTS

2002/0178143 A1 11/2002 Fujimoto
2004/0117496 A1 6/2004 Mittal et al.
(Continued)

FOREIGN PATENT DOCUMENTS

EP 2 710 456 3/2014
JP 2005-316629 11/2005
(Continued)

OTHER PUBLICATIONS

Japanese Office Action for Japanese Application No. 2011-110650 mailed on Feb. 4, 2014, 4 pages.
(Continued)

*Primary Examiner* — Brendan Higa
(74) *Attorney, Agent, or Firm* — Amin, Turocy & Watson LLP

(57) ABSTRACT

There is provided a data transferring apparatus that transfers file data stored in a storage apparatus that manages data in a block unit, in which the first issuing unit, in response to a request from a CPU, generates and sends a reading command of metadata including first map information showing in which location first file data is stored, to the storage apparatus, the second issuing unit receives a reading command of the first file data from the CPU that has obtained the metadata, generates and sends a reading command of a block storing the first file data to the storage apparatus, the extracting unit receives block data read from the storage apparatus, receives the first map information from the CPU and, based on the first map information, extracts the first file
(Continued)

data from the block data, and the communication processing unit transmits the first file data to the network.

10 Claims, 6 Drawing Sheets

(56) References Cited

U.S. PATENT DOCUMENTS

| | | |
|---|---|---|
| 2004/0210584 A1 | 10/2004 | Nir et al. |
| 2007/0011413 A1 | 1/2007 | Nonaka et al. |
| 2012/0110397 A1 | 5/2012 | Tanaka et al. |
| 2014/0012948 A1 | 1/2014 | Tanaka et al. |

FOREIGN PATENT DOCUMENTS

| | | |
|---|---|---|
| WO | 2004077211 | 9/2004 |
| WO | 2012-157335 | 11/2012 |

OTHER PUBLICATIONS

Office Action of Notification of Reason for Rejection for Japanese Patent Application No. 2011-110650 Dated Sep. 17, 2013, 4 pgs.
International Search Report for PCT/JP2012/057252 mailed on Jul. 11, 2012.
Office Action for Canadian Patent Application No. 2,829,554 Dated Mar. 19, 2015, 5 pages.
Office Action for Canadian Patent Application No. 2,829,554 dated Jan. 27, 2016, 6 pages.
Office Action for Korean Patent Application No. 10-2013-7024392 Dated Jul. 30, 2014, 7 pgs.

| COMMAND NUMBER | ADDRESS OF DATA EXTRACTING UNIT |
|---|---|
| COMMAND 0 | 0x20200000 ~ 0x202007ff |
| COMMAND 1 | 0x20200800 ~ 0x20200fff |
| COMMAND 2 | 0x20201000 ~ 0x202017ff |
| . . . | . . . |

DATA TRANSFERRING APPARATUS, DATA TRANSMISSION SYSTEM AND DATA TRANSMITTING METHOD

CROSS REFERENCE TO RELATED APPLICATIONS

This application is a Continuation of International Application No. PCT/JP2012/057252, filed on Mar. 14, 2012, the entire contents of which is hereby incorporated by reference.

FIELD

The present embodiments relate to a data transferring apparatus, data transmission system and data transmitting method that perform communication protocol processing instead of a processor.

BACKGROUND

An HDD (Hard Disk Drive) and an SSD (Solid State Drive) directly connected to a computer are called "DASs" (Direct Attached Storages), while a network storage connecting these storages via a network increasingly becomes popular. The network storage is broadly classified into an SAN (Storage Area Network) and an NAS (Network Attached Storage). Known SANs include an iSCSI and a fiber channel or the like, in which a storage apparatus is connected to a host machine (a machine that uses the storage) via a network as a block device and a file system is provided on the host machine side. On the other hand, known NASes include an NFS (Network File System) or the like, in which the storage apparatus side is implemented to a file system and a host apparatus can access the storage from upper level for the file system. Accordingly, not only the host machine can be relieved from the load thereon, but also more than one host machines can advantageously share the file systems on the storage.

These network storages communicate mainly by means of Ethernet and use TCP/IP or UDP/IP, which is widely used in the Internet or the like, as a communication protocol. These widespread general-purpose techniques facilitate a network storage use, and the network storages have increased usefulness in terms of storage scalability and serviceability, as compared to a conventional DAS.

Recently, video streaming distribution increasingly becomes popular. For example, a content distribution server called "VOD (Video On Demand) server" performs streaming distribution. Such a content distribution server performs processing of reading video content from its own storage apparatus and transmitting it to a network-connected user terminal. Similarly, a Web server transmits content on a storage to a user terminal. As a communication protocol, for example, TCP/IP-based HTTP or UDP/IP-based RTP for real-time communication is used. Also, in the case of RTP, FEC (Forward Error Correction) or the like is used for error correction.

The speed of devices such as a storage and a network used for such a network storage, a VOD server or a Web server, are remarkably increased. In present, 1 Gbps Ethernet increasingly becomes the mainstream, and 10 Gbps Ethernet comes into use in a data center, or the like. The specifications of the next-generation 40/100 Gbps Ethernet systems are completed, and they are expected to steadily become popular in the future. With regard to a storage, in addition to the increased speed of HDD RAID striping processing (i.e. parallelization), recent SSD transfer performance is remarkably improved, so that a current product alone may have a reading rate over 2 Gbps. With regard to I/F-standard SATA for a storage apparatus, SATA 3.0 having a bandwidth of 6 Gbps is already popular. In view of the above, with regard to a network storage, it is expected that a 10-Gbps-class band is provided in the near future.

As such network storage performance is improved, the processing load on a host CPU controlling the storage increases. Conventionally, attempts have been made to solve the issue by using a technique called "TCP/IP offload engine" (hereinafter "TOE"). TOE is provided with a dedicated processor or dedicated circuit that performs the above-mentioned TCP/IP processing in place of a host CPU, and offloads the TCP/IP processing load on the host CPU. By using this TOE, it is possible to perform faster TCP/IP processing compared to conventional software communication protocol processing and contribute to the improvement of network storage performance.

A storage apparatus or TOE is controlled by a host CPU and it is assumed that data is inputted and outputted via a main memory. Therefore, in input/output of data on the storage to and from a network, data transfer between the storage apparatus (such as an SSD and an HDD) and the TOE is necessarily performed via the main memory.

Application software running on the host CPU which bridges them or data passing processing between the kernel space and user space of OS may cause several copies of transfer data to be generated on the main memory. Further, file system processing is required. In normal file system implementation, therefore, data read or written in sector units of fixed byte length from a storage is transformed into files of arbitrary byte length, and therefore data copy further occurs.

Thus, when data is transferred between a storage apparatus and a TOE, software processing intervenes in a host CPU and therefore the reading or writing in a main memory is required at least once, or multiple memory copies may occur on the main memory by OS, application or file system processing, and therefore the load on the main memory drastically increases.

Conventionally, a host CPU having sufficient processing performance and a high-speed main memory have been provided to cope with such a main memory load. In view of the fact that the transfer rate of a recent network storage is improved to nearly 10 Gbps, it imposes more or less a problem. In particular, upgrading of a host CPU is generally required to improve the main memory capability, and, in the case of a PC, a server or the like, upgrading of the attached chipset is equally required. This particularly exacerbates problems of cost and power consumption.

DETAILED DESCRIPTION

There is provided a data transferring apparatus that transfers, to a network, file data stored in a storage apparatus that manages data in a block unit, including a first issuing unit, a second issuing unit, a transmission data extracting unit and a communication processing unit.

The first issuing unit, in response to a request from an external host CPU, generates a reading command of metadata including first map information showing in which location on the storage apparatus first file data is stored, and sends the reading command to the storage apparatus.

The second issuing unit receives a reading command of the first file data from the external host CPU that has obtained the metadata returned from the storage apparatus, generates a reading command of a block storing the first file data and sends the reading command to the storage apparatus.

The transmission data extracting unit receives block data read from the storage apparatus according to the reading command, receives the first map information from the external host CPU and, based on the first map information, extracts the first file data from the block data.

The communication processing unit transmits the first file data extracted by the transmission data extracting unit to the network.

Embodiments of the present invention will be explained below with reference to the drawings.

(First Embodiment)

Figure 1:
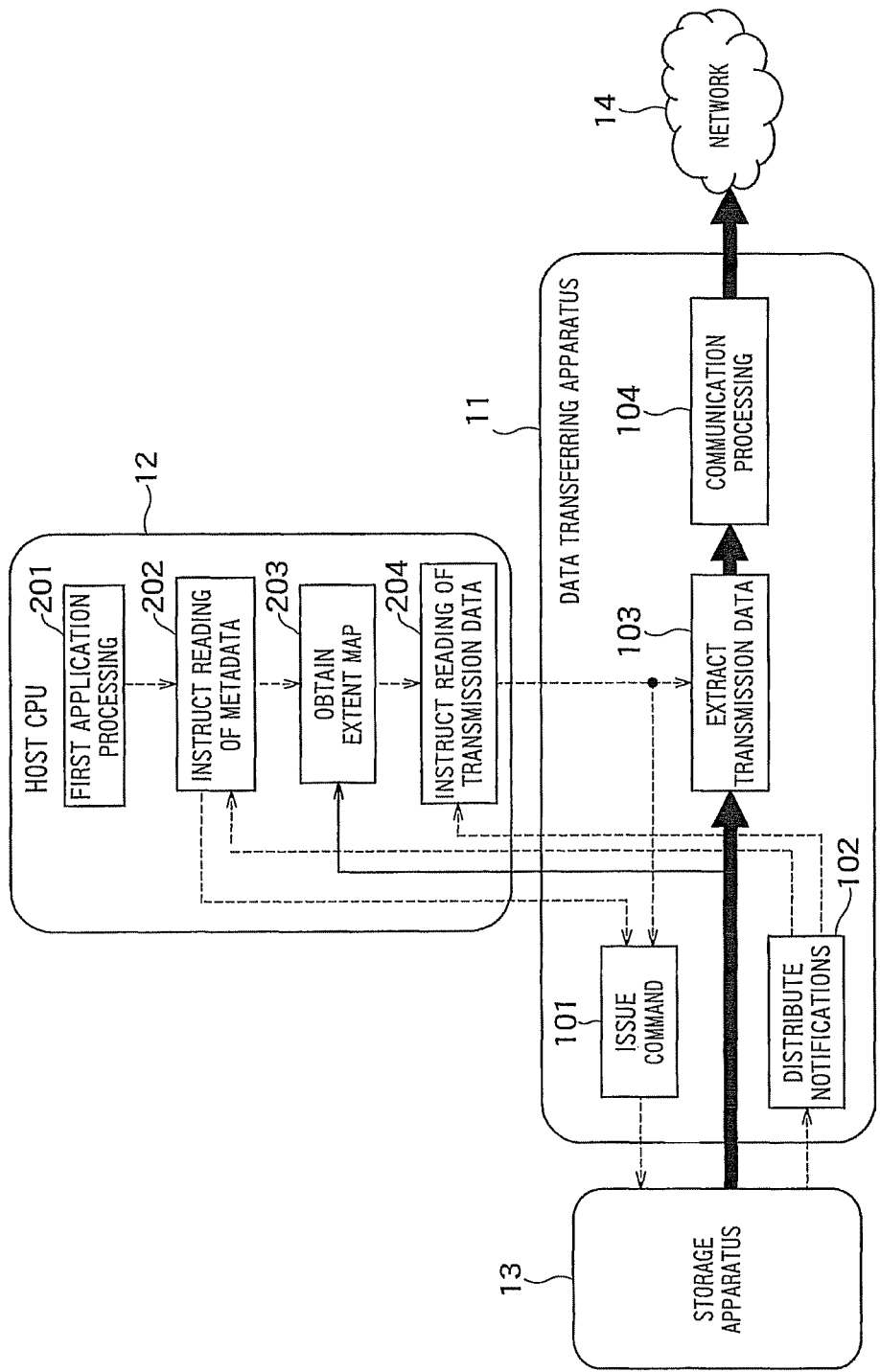
FIG. 1 is a block diagram showing a schematic configuration of a data transmission system according to a first embodiment.

FIG. 1 is a block diagram showing a schematic configuration of a data transmission system according to a first embodiment. A dotted-line arrow indicates a control flow, a solid-line arrow indicates a flow of data read from a storage, and a heavy-line arrow indicates a flow of transmission data in the read data.

The data transmission system in FIG. 1 includes a data transferring apparatus 11, a host CPU (processor) 12 and a storage apparatus 13. Based on control of the host CPU 12, the data transferring apparatus 11 reads data from the storage apparatus 13 and transmits it to a network 14.

Although it is assumed that a specific product form of the data transmission system of FIG. 1 denotes a PC, a server apparatus, a dedicated LSI, a network storage such as an FPGA (Field Programmable Gate Array), a VOD (Video On Demand) server or a Web server, it is not limited to these.

The host CPU 12 performs overall system control. As main processing units operated by software, the host CPU 12 has a first application processing unit 201 that performs data transmission application processing, a metadata reading instructing unit 202 that instructs the reading of metadata of the storage apparatus 13, an extent map obtaining unit 203 that analyzes the read metadata and obtains extent map information, and a transmission data reading instructing unit 204 that instructs the data transferring apparatus 11 to read and transmit data. It is natural that the host CPU 12 can perform other various processing.

The storage apparatus 13 stores data to be transmitted. It is expected that a specific implementation of the storage apparatus 13 denotes, for example, an SSD (Solid State Drive), an HDD (Hard Disk Drive) or an SD memory card, but it is not limited to these.

The data transferring apparatus 11 reads data from the storage apparatus 13 instead of the host CPU 12, performs communication processing and transmits the read data to the network 14. The data transferring apparatus 11 has command issuing units 101 (including a first issuing unit and a second issuing unit) that issues a command to the storage apparatus 13, a notification distributing unit 102 that receives a response notification of the issued command and distributes it in a corresponding components of the host CPU (in the configuration example in FIG. 1, the metadata reading instructing unit 202 and the transmission data reading instructing unit 204), a transmission data extracting unit 103 that receives the data read from the storage apparatus 13 and extracts necessary data, and a communication processing unit 104 that transmits the extracted data to the network 14. The communication processing unit 104 corresponds to the above-mentioned TOE. It is expected that a specific implementation of the data transferring apparatus 11 denotes an FPGA or a dedicated LSI, or it may be implemented as a PCI card or a PCI (Peripheral Component Interconnect)-Express card, but it is not limited to these.

The storage apparatus 13 may have a RAID (Redundant Arrays of Inexpensive Disks) function or an I/F with the storage apparatus 13 in the data transferring apparatus 11 may have the RAID function. These cases are not related to the essence of the present invention and therefore their explanation will be omitted.

The network 14 includes the Ethernet, a wireless LAN and any other wireless communication and wired communication.

In a case where the present apparatus is a PC or a server apparatus, the host CPU 12 and the data transferring apparatus 11 are connected by, for example, a chipset or a PCI express, or may be connected by, for example, a dedicated bus in the case of SoC or the like. The storage apparatus 13 and the data transferring apparatus 11 are connected by, for example, an SATA, an SAS, an SCSI or an SD memory card standard. These are just examples and it is not limited to these.

The data transferring apparatus 11 may be configured by hardware or software and its implementation does not matter, but it is preferably configured on a hardware-basis in view of processing efficiency. Also, any communication processing performed in the communication processing unit 104 is possible, which includes, for example, TCP/IP-based protocol processing, UDP/IP-based protocol processing, Ethernet processing and wireless processing. It should be noted that, in the case of a protocol to be connected to a destination apparatus like TCP, the following operation explanation assumes operations in a stage of data transfer after connection is established with the connection party.

The storage apparatus 13 manages data in a unit of sector, for example. Here, it is abstractly called "block." Data treated by a user is not block-unit data, and therefore the storage apparatus 13 is normally accessed by a file system. The file system denotes a system of mapping file data at byte-unit into a recording area (storage are) at block-unit in the storage apparatus 13. A well-known file system is used and therefore its detailed explanation will be omitted, but briefly explaining, metadata (which includes other various information) including mapping information is stored together with data in a certain area on the storage. When reading file data from the storage, first, this metadata is read and analyzed to obtain information (first map information) showing in which block desired file data is actually stored (i.e. extent map). Then, block data is read according to the extent map information, and only a required part is extracted to obtain desired data. The extent map is specifically provided as in FIG. 2.

Figures 2, 3:
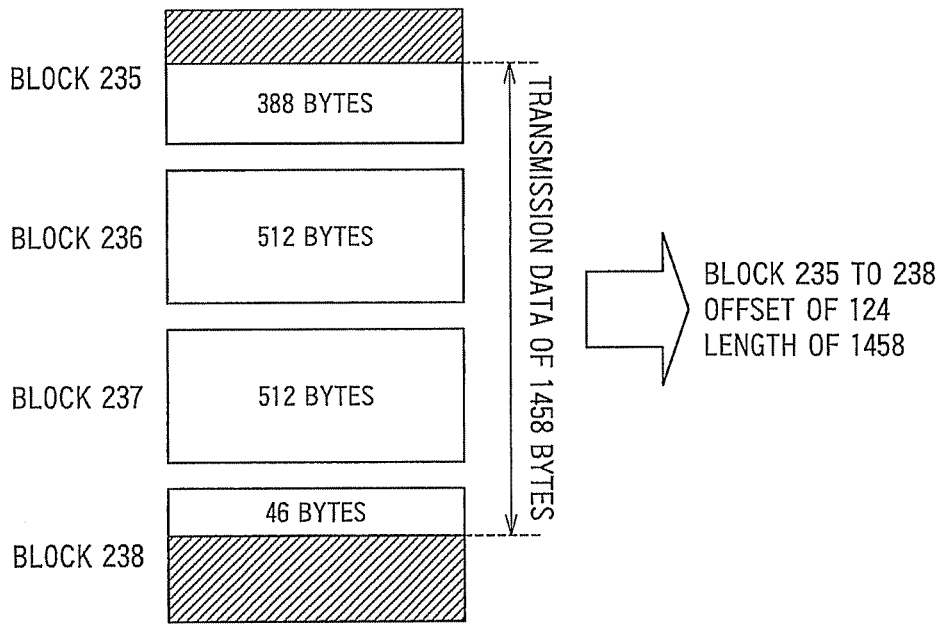
FIG. 2 is a diagram showing an example of data stored in a storage apparatus.
FIG. 3 is a diagram showing associations between commands and address areas of a transmission data extracting unit.

FIG. 2 shows a state where one block is 512 bytes and a certain part of desired file data is stored in blocks 235 to 238. The data starts from the 124-th byte of the block 235 and is therefore expressed by an offset of 124 bytes and length of 1458 bytes.

Thus, the extent map denotes information of block locations in which data is stored, specifically, and information of valid data locations in which valid data of the data is stored. That is, the extent map information denotes information for specifying in which of the storage desired data is stored.

In this example, although byte locations in which data is stored are expressed by offset and length, they may be expressed by, for example, the start byte location and the end byte location, and the expression form does not matter as long as it is possible to specify locations of valid data.

Also, in this example, although one data sequence of 1458 bytes is provided as an example, extent map information may be expressed by a plurality of discrete data sequences. That is, one extent map information may include two data sequences, that is, information showing 1458 bytes among blocks 235 to 238 and information showing 2000 bytes among blocks 346 to 250.

It should be noted that, although the above-mentioned extent-based file system is applicable, the present invention includes a block (or cluster)-based file system. In the case of the block (or cluster)-based file system, a block (cluster) list is provided instead of extent, but, if this is regarded as an extent special case (where the length of one extent is fixed to 512 bytes), the same is applicable. In the following, an explanation will be given using the term "extent," which includes those.

In a well-known technique, normally, the host CPU 12 executes control software such as a device driver and file system software based on a file data reading request by an application, thereby obtaining this extent map, performing reading from a desired data storage according to the extent map and returning the read data to the application. Meanwhile, according to the present embodiment, the data transferring apparatus 11 takes care of part of the processing and transmits the data read from the storage to the network 14 without returning it to the host CPU 12. The specific processing flow is as follows.

First, by given processing of an application software, the first application processing unit 201 specifies a transmission file (first file) and a data location in the file if necessary. As a typical example, based on a request from another device connected to the network 14, the file is specified. Then, file information (including a file identifier and the data location in the file if necessary) is transmitted together with a transmission instruction of the file to the metadata reading instructing unit 202.

To read metadata of the file system from the storage apparatus 13 based on the provided information, the metadata reading instructing unit 202 instructs the command issuing unit 101 of the data transferring apparatus 11 to issue a command. The command issue instruction includes a file identifier and a data location if necessary. The command issuing unit 101 issues a metadata reading command (i.e. first command) and transmits it to the storage apparatus 13. Among functions held in the command issuing unit 101, a function of issuing the first command corresponds to a first issuing unit.

Based on this command, the storage apparatus 13 reads the corresponding metadata and provides it to the extent map obtaining unit 203.

The extent map obtaining unit 203 analyzes this metadata information and obtains an extent map of file data to be read. It should be noted that obtaining the extent map information may be performed with reference to what is cached in advance, it is necessary to perform reading in advance in the same way.

Then, the transmission data reading instructing unit 204 provides the obtained extent map information to the data transferring apparatus 11 and instructs the data transferring apparatus 11 to read and transmit the data.

In the data transferring apparatus 11, the command issuing unit 101 receives the extent map information and issues a block reading command (i.e. second command) to read a block storing data to be transmitted, based on the information. Among the functions held in the command issuing unit 101, a function of issuing the second command corresponds to a second issuing unit. Although the command depends on an I/F system on the side of the storage apparatus 13, there is normally a case where the number of blocks that can be read at a time is limited or where discrete blocks cannot be designated at the same time, and, consequently, there is a case where one extent map information is divided into a plurality of command groups, and therefore the division processing is performed.

Then, if the command issuing unit 101 issues those commands in order to the storage apparatus 13, the storage apparatus 13 quickly returns a block(s) including data as a response, and the transmitting data extracting unit 103 receives the block data.

Meanwhile, when giving an instruction to the command issuing unit 101, the transmission data reading instructing unit 204 provides, to the transmission data extracting unit 103, information showing in which part of blocks corresponding to individual commands the data to be transmitted is included.

That is, in the above-described example in FIG. 2, the transmission data reading instructing unit 204 provides block location information of blocks 235 to 238 to the command issuing unit 101 and provides valid data location information, which includes an offset of 124 bytes and length of 1458 bytes, to the transmission data extracting unit 103.

Based on this information, the transmission data extracting unit 103 extracts a desired data sequence of 1458 bytes from received block data and provides it to the communication processing unit 104.

Then, the communication processing unit 104 communicates control information with a destination apparatus if necessary and transmits the data onto the network 14.

I/F processing with the storage apparatus 13 will be explained in detail. First, in a case where the storage apparatus 13 has an SATA I/F such as a typical SSD or HDD and has a function as a bus master (i.e. DMA function), with regard to a command to the storage apparatus 13, data describing a command called "descriptor" is prepared on a predetermined memory and read by the storage apparatus 13 to provide the command to the storage apparatus 13. The above-mentioned command issuing unit 101 performs such processing.

The descriptor is normally in a ring buffer form and, in a typical well-known technique, is placed on a main memory (which is a main storage apparatus (not shown)) used by the host CPU 12. Although the same form as above is applicable to the present embodiment, it is desirable to use a memory in the data transferring apparatus 11 or a memory which is directly connected to the data transferring apparatus 11, in view of the fact that the main memory does not burden the host CPU 12.

Also, a destination address in which the block data read by the storage apparatus 13 is written by DMA, is designated in advance in each descriptor, but distribute processing of providing the read metadata to the host CPU 12 and providing transmission data to the communication processing unit 104 is realized by that address designation. That is, when metadata is provided to the host CPU 12, it is normally performed via a main memory, and therefore the main memory address is described as a destination address described in a descriptor. When transmission data is provided to the communication processing unit 104, the address of the communication processing unit 104 is described as the destination address. Accordingly, only by writing read data in the destination address designated in the descriptor by the storage apparatus 13, it is possible to distribute the read data individually.

Also, although the storage apparatus 13 performs a command completion notification (i.e. response notification) after executing a command and reading data, the notification is performed by interrupt or the like, and it notifies up to which command is processed, that is, up to which descriptor is processed in a ring-buffer descriptor group, by setting "DONE" bits showing the processing completion of each descriptor, for example. That is, when receiving an interrupt notification, the host CPU 12 reads descriptors for which the "DONE" bits are written in order (and then resets the read bits), so that it is possible to decide that processing up to that time is completed. Here, a case is possible where processing of multiple descriptors is completed at a time.

In a case where the descriptors decided to be completed as above are for metadata reading, the notification distributing unit 102 notifies to the metadata reading instructing unit 202, and, in a case where the descriptors are for transmission data reading, the notification distributing unit 102 notifies to the transmission data reading instructing unit 204, to distribute completion notifications.

When receiving this notification, the metadata reading instructing unit 202 decides that the reading of metadata is completed, and instructs the extent map obtaining unit 203 to obtain an extent map.

Also, block data transfer by the storage apparatus 13 normally involves certain latency, and therefore there is a case where the host CPU 12 collectively issues reading commands of multiple blocks to the storage apparatus 13, without waiting for the implementation completion from the storage apparatus 13 each time. In this case, synchronization is not established between the transmission data reading instructing unit 204 (and the metadata reading instructing unit 202), the storage apparatus 13 and the transmission data extracting unit 103, and therefore, for example, the following methods are adopted to establish synchronization.

A first method is effective in a case where the storage apparatus 13 necessarily performs reading in the same order as the commands are received, and denotes a method whereby, when providing reading instructions of multiple commands to the storage apparatus 13, the transmission data reading instructing unit 204 notifies location information of valid data of corresponding blocks to the transmission data extracting unit 103 in the same order as the instructions. For example, the transmission data extracting unit 103 queues the received valid data location information, and, when receiving block data from the storage apparatus 13, extracts the queued valid data location information one by one in order of the queuing, thereby realizing correspondence to block data.

A second method is that the storage apparatus 13 may perform reading in reverse order of the command reception order in a case where, for example, efficiency of internal processing is prioritized. In this case, it is expected that, for example, a different address is designated as the destination address of each block. That is, for example, in a case where four reading commands are collectively instructed to the storage apparatus 13, different transfer destination addresses are designated for these four commands. In the present embodiment, the address of the transmission data extracting unit 103 is designated as a transfer destination address, and in the case of using this system, for example, in the case of providing reading instructions of maximum four blocks by one command, different address areas in the address area of the transmission data extracting unit 103 are designated for transfer destination addresses corresponding to individual commands.

For example, when the address area of the transmission data extracting unit 103 is between 0x20200000 and 0x202fffff, as shown in FIG. 3, correspondence is established such that a 512×4-byte area of 0x20200000 to 0x202007ff supports command 0, a 512×4-byte area of 0x20200800 to 0x20200fff supports command 1, a 512×4-byte area of 0x20201000 to 0x202017ff supports command 2, and so on, and the transmission data reading instructing unit 204 instructs the command issuing unit 101 to designate the heads of these address areas to respective commands. Then, although transferred block data is consistently transferred to the transmission data extracting unit 103, each data is transferred to a different address area in the transmission data extracting unit 103, and, if the transmitting data extracting unit 103 having received the data finds that the received block data is, for example, data written in the address starting from 0x20201200, it is possible to specify second block data from the head of command 2. If valid data location information of this command 2 is as shown in FIG. 2, it is found that this block data denotes 900-th byte data from the 389-th byte of valid data Meanwhile, the transmission data reading instructing unit 204 notifies eight items of valid data location information to the transmission data extracting unit 103, and at this time, they are notified to the transmission data extracting unit 103 such that valid data location information corresponding to command 0, valid data location information corresponding to command 1, valid data location information corresponding to command 2, and so on, are clarified. Accordingly, the transmission data extracting unit 103 can decide to which command the received data and valid data location information belong, so that the transmission data extracting unit 103 can associate these. It should be noted that using an address is just an example of the present invention, and other information can be used as long as it can be notified from the storage apparatus 13 to the transmission data extracting unit 103.

In this way, even in a case where the order of block data received in the transmission data extracting unit 103 is different from the original data sequence order (which is normally the order of transmission to the network 14) by dividing the block data destination address area, it is possible to decide on which command the data is based by checking the destination address of the block data, and, based on this, it is possible to rearrange a data sequence to the original order.

The above-described storage I/F detail is just an example, and the present invention is not limited to this.

Also, a case is possible where the storage apparatus 13 cannot complete a command requested due to some reasons such as internal error. In this case, although the storage apparatus 13 performs error report to the data transferring apparatus 11, in such a state, the host CPU 12 cannot obtain this information, and, therefore, the data transferring apparatus 11 relays the error report to the host CPU 12, so that the host CPU 12 can find the anomaly as usual.

The first embodiment of the present invention has been described above. By using the above-described embodiment, based on a request from an application, it is possible to transmit data on the storage apparatus 13 to the network 14 without giving a data transfer processing load to the host CPU 12 and a main memory (not shown), so that it is possible to improve the processing efficiency and the data transfer rate. Also, it is possible to degrade the host CPU 12 or its accompanying chipset, memory and motherboard, so that it is possible to reduce the cost of the apparatus. Also, it is possible to perform most of data transfer processing by hardware processing in the data transferring apparatus 11 instead of software processing in the host CPU 12, so that it is possible to reduce the power consumption of the apparatus.

It should be noted that, among the above, the notification distributing unit 102 needs not be necessarily formed on the data transferring apparatus 11, and it may be formed on the host CPU 12. Also, although the command issuing unit 101 may perform partial processing on the side of the host CPU 12, in view of the processing efficiency, it is preferable that processing of dividing one transmission data reading instruction into a plurality of commands is performed on the data transferring apparatus 11. By contrast, the metadata reading instructing unit, the extent map obtaining unit and the transmission data reading instructing unit may formed on the data transferring apparatus 11.

Also, an embodiment is preferable where processing of giving file information specified by the first application processing unit 201 to a subsequent processing unit is interfaced by a standard system call such as a send file function implemented with Linux OS or the like and processing in this function is provided to be able to realize the above-described operations. By performing an interface with an application by such a standard function, an existing application needs not be changed, so that it is possible to ease an implementation of the present invention.

Figure 4:
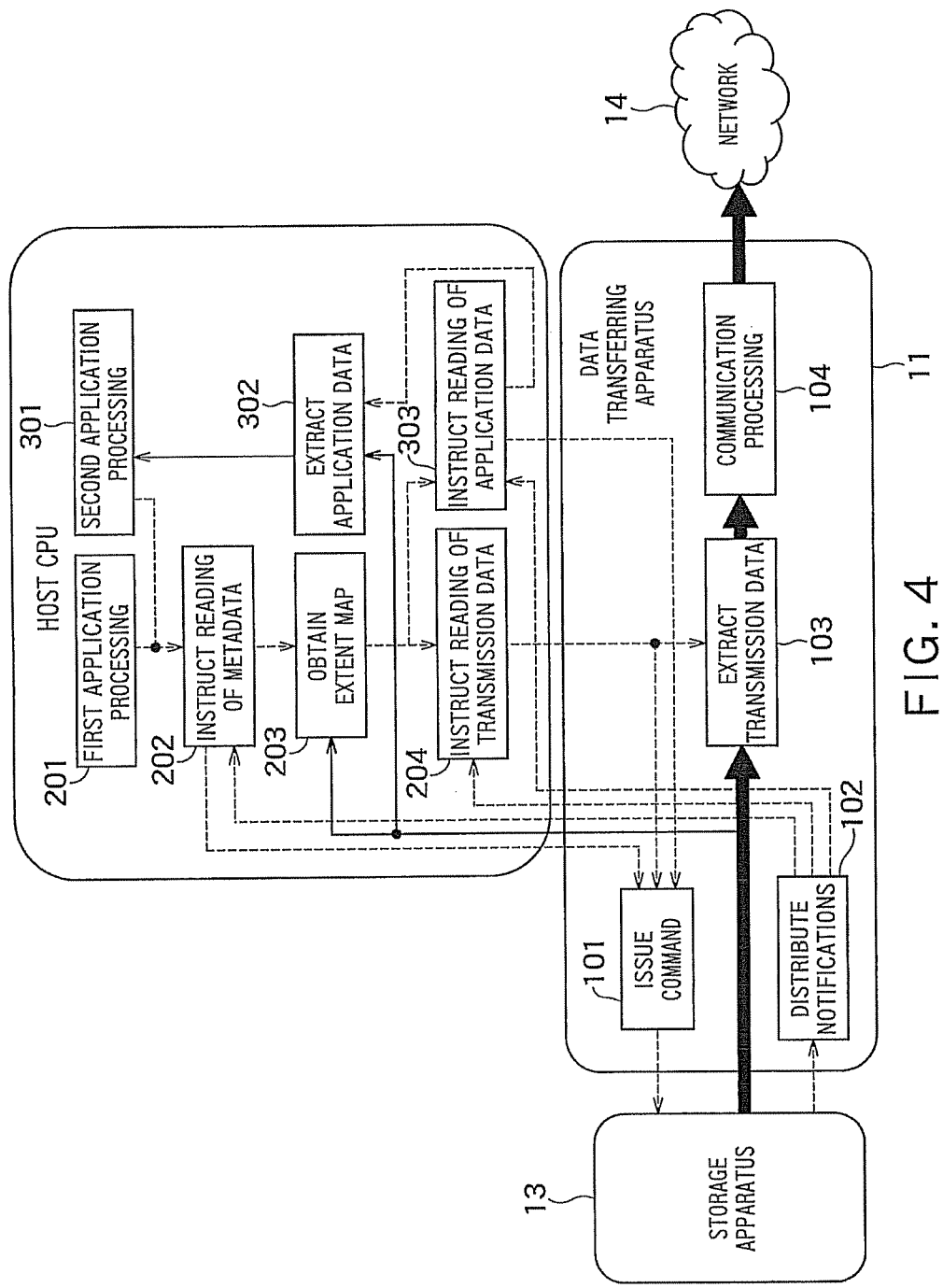
FIG. 4 is a diagram showing another example of a data transmission system according to the first embodiment.

By the above configuration, although it is possible to perform data transfer from the storage apparatus 13 to the network 14 without involving the host CPU 12, a case is possible where this form is not preferable. For example, there is a case where the host CPU 12 itself is requested to reference a file (i.e. second file) data in the storage apparatus 13 by other application processing or the like, without data transfer. The configuration for the case is as shown in FIG. 4. A second application unit 301 in FIG. 4 denotes an application processing unit requested to simply read data on a storage without data transmission. Further, in addition to FIG. 1, FIG. 4 further provides an application data reading instructing unit 303 that instructs the data transferring apparatus 11 to read the data, and an application data extracting unit 302 that obtains the read data and extracts valid data.

The configuration shown in FIG. 4 performs the following operations. First, processing based on a data transmission request by the first application processing unit 201 is the same as in FIG. 1. Meanwhile, when performing a data reading request (i.e. acquisition instruction) of the file (i.e. second file), the second application processing unit 301 reads metadata in the same way as in the first application processing and obtains extent map information (i.e. second map information) of data to be read, but, in the case of performing a data reading instruction based on the above, the application data reading instructing unit 303 provides a reading instruction to set the destination address of the read data to a main memory (not shown). Then, data read from the storage apparatus 13 is written in the main memory, and therefore the application extracting unit 302 reads the data. Here, similar to the transmission data extraction, among extent map information of application data, valid data location information is given from the application data reading instructing unit 303 to the application data extracting unit 302, and therefore the application extracting unit 302 extracts valid data based on the information and gives it to an application. The notification distributing unit 102 notifies a response notification with respect to an application data reading command, to the application data reading instructing unit 303.

By operating as above, it is possible to perform efficient data transmission by the data transferring apparatus 11 and data reading by a conventional application together, so that it is possible to each an implementation of the present invention.

Also, an embodiment is preferable where a data reading request by the second application processing unit 301 is interfaced by a standard system call such as a read function implemented with Linux OS or the like and processing in this function is provided to be able to realize the above-described operations. By performing an interface with an application by such a standard function, an existing application needs not be changed, so that it is possible to ease an implementation of the present invention.

(Second Embodiment)

A second embodiment shows an example where a plurality of communication connections are set for data transfer and flow control is independently performed for each connection. For example, when simultaneously receiving reading requests or content distribution requests from a plurality of client terminals or a plurality of applications on a client terminal in a network storage such as a NAS or a VOD server, it is possible to realize an operation of reading data from the storage apparatus 13 by independent multiple connections and transmitting it to the network 14.

Figure 5:
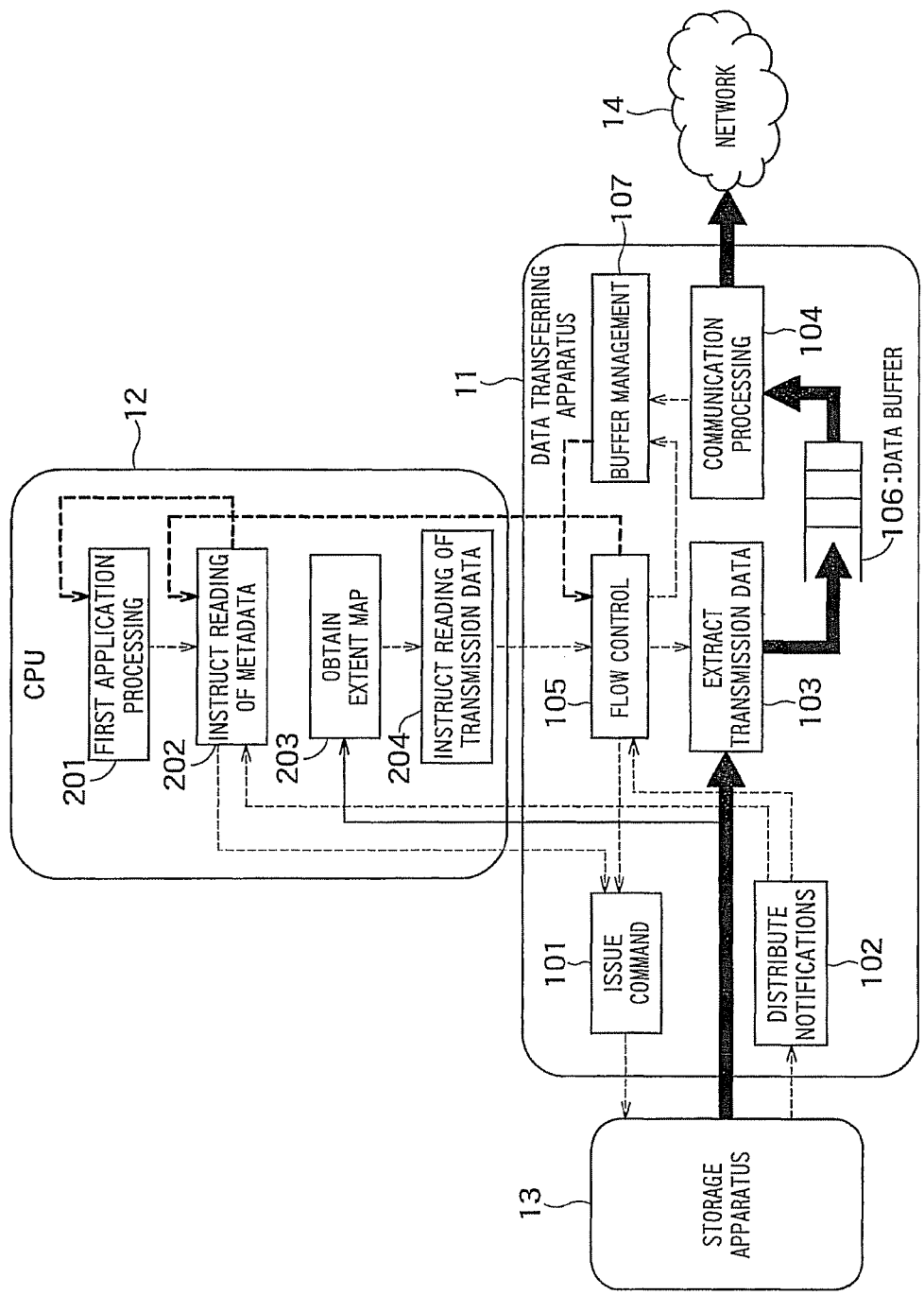
FIG. 5 is a block diagram showing a schematic configuration of a data transmission system according to a second embodiment.

FIG. 5 is a block diagram showing a schematic configuration of a data transmission system according to the second embodiment. In addition to the first embodiment, the data transferring apparatus 11 in FIG. 5 further includes a data buffering unit 106 that buffers data every connection to pass the data between the transmission data extracting unit 103 and the communication processing unit 104, a buffer managing unit 107 that manages a buffer condition every connection in the data buffering unit 106, and a flow controlling unit 105 that performs flow control of data every connection based on a notification from the bugger managing unit 107.

In FIG. 5, each unit having the same reference numeral performs the same operation as in FIG. 1 and further performs an operation for flow control. Transmission of flow control information is represented by heavy dotted line.

The processing procedure of the data transmission system in FIG. 5 is as follows. First, in the same way as in FIG. 1, by given processing of an application software, the first application processing unit 201 specifies a transmission file and a data location in the file if necessary. As a typical example, based on a request from another device connected to the network 14, the file is specified. Then, the information is given to the metadata reading instructing unit 202. Here, this time, an application uses a plurality of connections, and therefore the first application processing unit 201 gives information on the specified file data together with a connection identifier to identify a connection.

To read metadata of the file system from the storage apparatus 13 based on the given file information, the metadata reading instructing unit 202 instructs the command issuing unit 101 of the data transferring apparatus 11 to issue a command. Based on this command, the storage apparatus 13 reads metadata and provides it to the extent map obtaining unit 203. The extent map obtaining unit 203 analyzes this metadata information and obtains an extent map of file data to be read.

Then, the transmission data reading instructing unit 204 provides the obtained extent map information to the data transferring apparatus 11, provides the connection identifier given from the above-described application to the data transferring apparatus 11 and instructs the data transferring apparatus 11 to read and transmit the data.

In the data transferring apparatus 11, first, the flow controlling unit 105 receives the instruction. The flow controlling unit 105 holds extent map information for each connection. That is, it temporarily holds data reading requests of multiple connections. Then, when a notification of a connection having an available buffer is received from the buffer managing unit 107, a reading instruction of transmission data for the connection is given to the command issuing unit 101. In the initial state, buffers of all connections are available and therefore a transmission data reading instruction is given to the command issuing unit 101 without receiving the notification from the buffer managing unit 107, but there is a case where, if data transmission requests for the same connection are consecutively given, an availability notification from the buffer managing unit 107 is waited for a while.

It is essential that the command issue requests are given at a time to the command issuing unit 101 only when they are equal to or less than the available buffer size. As an example, in a case where the buffer of 128 KB is maintained for each connection of the data buffering unit 106, if an available buffer equal to or greater than 64 KB is provided in one of the connections, the buffer managing unit 107 notifies the buffer availability of the connection to the flow controlling unit 105. Although it may be natural that an extent map given from the host CPU 12 shows data greater than that size, the flow controlling unit 105 can request only partial data equal to or less than available 64 KB to the command issuing unit 101 at a time, and therefore the reading of this partial data (i.e. data which is not read among data to be transmitted and which is equal to or less than that size) is requested to the command issuing unit 101. At the same time, a valid data location of this partial data is given to the transmission data extracting unit 103. Then, a processed partial data location is held as progress information for each connection and a command issue request is temporary terminated.

Figure 6:
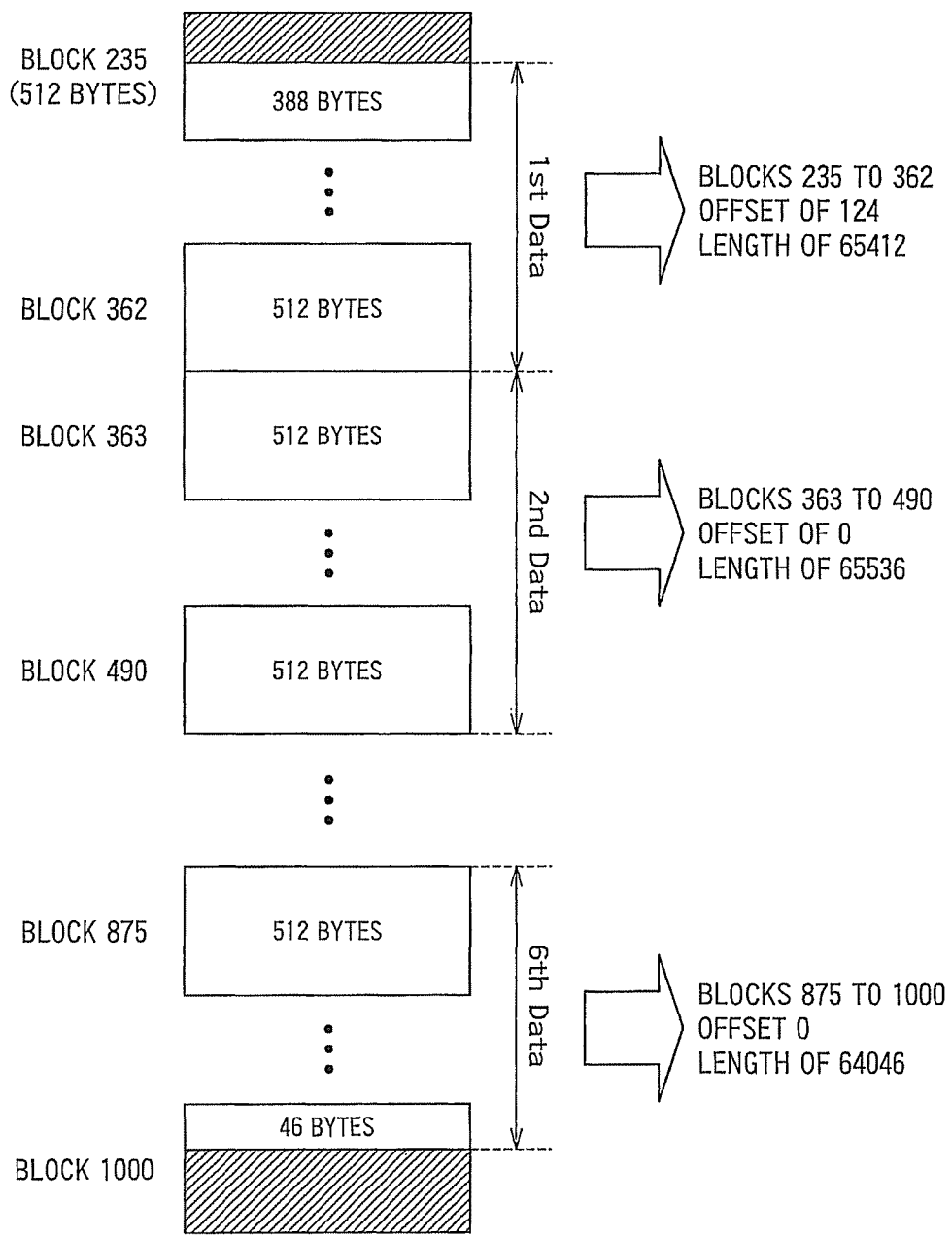
FIG. 6 is a diagram showing another example of data stored in a storage apparatus.

For ease of explanation of the above processing, an example of data is shown in FIG. 6. FIG. 6 shows an example where the host CPU 12 gives an extent map, which includes blocks 235 to 1000 and an offset of 124 bytes and length of 391602 bytes as valid location data information. In this case, the first partial data is, for example, blocks 235 to 362 of 65412 bytes as a round figure equal to or less than 64 KB. Then, the valid data location of this partial data is an offset of 124 bytes and length of 65412 bytes. The flow controlling unit 105 requests a reading command for blocks 235 to 362 to the command issuing unit 101 and provides information of an offset of 124 bytes and length of 65412 bytes to the transmission data extracting unit 103 at the same time, holds information that a block to be processed next is block 363 or a 65413-th byte as progress information, temporarily terminates processing and waits for the next buffer availability notification from the buffer managing unit 107. It should be noted that various data sizes such as 64 KB described above are just examples and are not essential. Also, the data size needs not be constant, and the present invention includes a case where the size changes every time.

Partial data processing is temporarily terminated, and, when receiving a notification from the buffer managing unit 107 that a data buffer of a different connection is available, the flow controlling unit 105 then performs reading request processing of partial data for the connection. Further, when all of data indicated by the given extent map for a certain connection has been transmitted (in the case of FIG. 6, when a reading request for the sixth partial data is completed), transmission of all of data indicated by the extent map given for the connection is completed, which is notified to the host CPU 12. In the host CPU 12, for example, the metadata reading instructing unit 202 receives this notification, which enables data transmission processing by the subsequent application or a series of processing starting from the metadata reading instructing unit 202. By contrast, by temporarily stopping the next metadata reading until this notification is received, flow control with the first application processing unit 201 is realized.

It should be noted that the host CPU 12 needs not necessarily receive this notification in the metadata reading instructing unit 202, and the extent map obtaining unit 203 or the transmission data reading instructing unit 204 is possible, that is, any unit can receive it as long as back pressure finally communicates to the application.

Also, although an example has been described above where the data transferring apparatus 11 accepts only one extent map for each connection at a time, it may accept two or more. The number to be accepted is necessarily limited, and therefore the above-described method is applied as a system in which after the accepting of maximum number of extent maps is performed, the accepting of an additional extent map fails.

Although processing in the command issuing unit 101 and processing in the transmission data extracting unit 103 are basically the same as in FIG. 1, the transmission data extracting unit 103 receives data valid location information from the flow controlling unit 105 as described above and writes data extracted based on the information, in the data buffering unit 106. A destination address in the case of writing it in the data buffering unit 106 is generated in the flow controlling unit 105 and given to the transmission data extracting unit 103.

For example, in the same way as above, when 128 KB is reserved for each connection in the data buffering unit 106 and buffer head addresses are assigned like 0x00000000 for connection 0, 0x00020000 for connection 1, 0x00040000 for connection 2, and so on, and, in a case where connection 1 is currently processed and the data reading in FIG. 6 is requested for the first time, the destination address of the first partial data is 0x00020000 and the destination address of the next partial data is 0x0002ff85 which is added by 65413 bytes. In this way, when the destination address is increased every partial data size, one collective data is provided in the data buffering unit 106. Also, for example, when the buffer is a byte-unit ring buffer, the next byte to 0x0003ffff is written in 0x00020000. The flow controlling unit 105 gives such destination address information together with valid data location information to the transmission data extracting unit 103 and the transmission data extracting unit 103 writes data extracted from an address based on it, so that it is possible to provide suitable transmission data for each connection to the data buffering unit 106.

The buffer managing unit 107 always recognizes, for each connection of the data buffering unit 106, the supply-side data writing location of data buffer and the consumption-side reading location of the data, and recognizes the buffer availability state for each connection.

To be more specific, the flow controlling unit 105 requests the reading of partial data to the command issuing unit 101, and, when a response notification is returned from the storage apparatus 103, the flow controlling unit 105 finds until which location of the buffer corresponding to the connection the data is written, and therefore notifies the location to the buffer managing unit 107 as progress. For example, when the first partial data in FIG. 6 has been written, information of 65413 bytes is notified together with a connection identifier. By this notification, the buffer managing unit 107 can find the supply-side location of data in the buffer of connection 1 as 65413 bytes.

Meanwhile, when the communication processing unit 104 reads transmission data from the data buffering unit 106, the reading location is shifted and therefore the communication processing unit 104 similarly notifies a byte location in which the reading is completed (accurately, a byte location in which the next reading is started) to the buffer managing unit 107.

In the initial state, although 128 KB (accurately, 131072 bytes obtained by 2 raised to the 17th power) is available in a buffer, when data is written first, the available size decreases by 65413 bytes and becomes 65659 bytes, which are greater than 64 KB (accurately, 65536 bytes obtained by 2 raised to the 16th power), and therefore a buffer availability notification is performed for the flow controlling unit 105. Then, the flow controlling unit 105 issues a reading request of the next partial data (65536 bytes in the example of FIG. 6), and, when the data is written, the buffer size further decreases to 23 bytes, which are less than 64 KB, and therefore the buffer managing unit 107 does not perform an availability notification and the flow controlling unit 105 holds the reading of the next partial data. After that, for example, when the communication processing unit 104 reads data of 1 KB (1024 B), the available buffer size increases to 1047 bytes. Continuously, the communication processing unit 104 performs reading, and, when the available size is equal to or greater than 65536 bytes, the buffer managing unit 107 notifies an availability notification to the flow controlling unit 105 at that time.

The transmission rate of the communication processing unit 104 is limited by a communication protocol scheme to be used or a band of the network 14. For example, in a case where flow control or convergence control is performed like a TCP protocol, the transmission rate decreases depending on the facing apparatus or the congestion status of the network 14, and, the reading progress of data from the data buffering unit 106 is delayed. Even in this case, however, it is possible to adequately realize flow control to the highest-order application by such a configuration.

The second embodiment of the present invention has been described above. By using such an embodiment, in addition to the effect of the first embodiment, it is possible to adequately perform flow control even when the communication rate becomes late. Also, it is possible to perform flow control for each communication connection, and, even when a data flow of a certain connection stops, it is possible to perform operations not to affect data flows of other connections.

Figure 7:
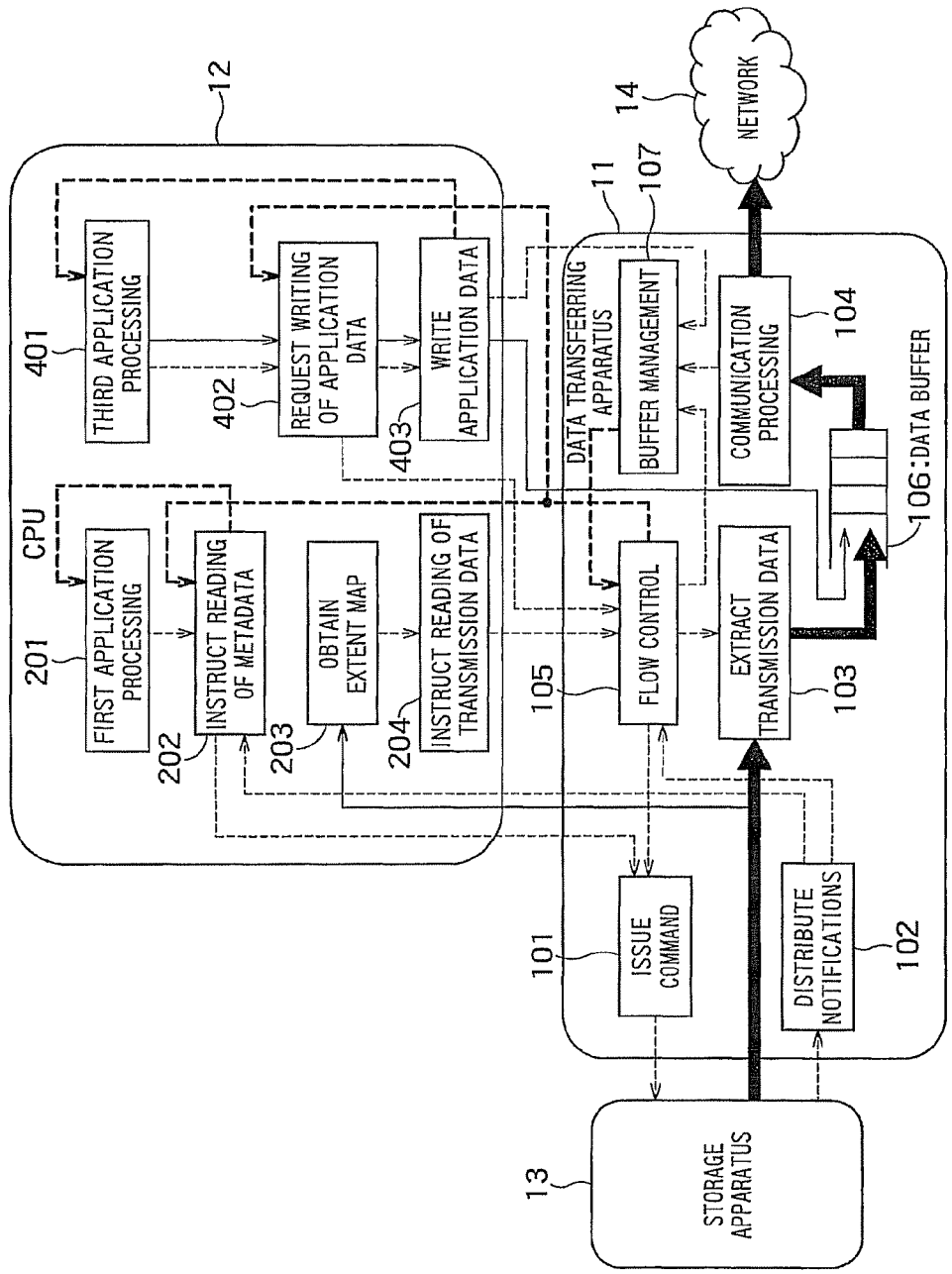
FIG. 7 is a diagram showing another configuration example of a data transmission system according to the second embodiment.

Although examples have been described in the above embodiments where data in the storage apparatus 13 is efficiently transmitted, a case is possible for a given application where data which is not in the storage apparatus 13 is transmitted by the same connection as a connection to transmit data in the storage apparatus 13. For example, when the communication processing unit 104 performs communication processing of a lower layer than a TCP/IP protocol and an application performs communication based on an HTTP protocol of the higher layer, a case is possible where different data (control information etc.) from data in the storage apparatus 13 is processed, or an HTTP header of data needs to be transmitted when transmitting data in the storage apparatus 13. In this case, operations need to be performed such that, first, only the HTTP header is transmitted and then data of the storage apparatus 13 is transmitted as a body. A configuration to realize such operations is shown in FIG. 7.

In addition to FIG. 6, FIG. 7 includes a third application processing unit 401 that requests transmission of data (hereinafter "application data") that is not in the storage apparatus 13 such as an HTTP header, an application data writing requesting unit 402 that accepts the request and requests the writing of application data to the data transferring apparatus 11, and an application data writing unit 403 that performs the writing of application data. The flow of application data is expressed by a solid line.

To be more specific, the following operations are performed. First, the third application processing unit 401 prepares application data in a given method. For example, in a case where HTTP communication is performed, it is determined by communication procedure, application status or other various conditions and then generated. Then, to transmit the application data by the data transferring apparatus 11, transmission is requested such that the application data and a transmission connection identifier are given together to the application data writing request unit 402.

When receiving it, the application data writing requesting unit 402 provides the application data size and a data writing request to the flow controlling unit 105.

When receiving these, the flow controlling unit 105 temporarily holds the writing request, waits for an availability notification from the buffer managing unit 107, and, as soon as the buffer availability notification is given from the buffer managing unit 107, returns a response indicating a writing permission to the application data writing requesting unit 402.

Then, the application data writing requesting unit 402 provides a writing instruction to the application data writing unit 403 and the application data writing unit 403 actually writes the application data in a data buffer.

When the writing is finished, in the same way as a case where the flow controlling unit 105 reads data of the storage apparatus 13 and writes it in the data buffering unit 106, the writing location is notified to the buffer managing unit 107 as progress.

When the above series of processing is completed, a transmission completion is notified to the third application processing unit 401. The communication processing unit 104 reads and transmits this data in the same way as data from the storage.

When the application data size is greater than the size (64 KB in the above example) to perform a buffer availability notification in the buffer managing unit 107, the writing is possible only by 64 KB, and, in this case, the application data writing unit 403 performs the writing up to the size. Further, if there is data that is not written yet, the application data writing requesting unit 402 provides a writing request again to the flow controlling unit 105 and the similar processing is repeated until data to be written has been processed.

Also, when the writing size of application data is extremely small such as a communication header, the flow controlling unit 105 may instruct a size change to the buffer managing unit 107 to set an availability size to be notified from the buffer managing unit 107, to an application data size, for example. For example, when application data of 20 bytes is transmitted, the flow controlling unit 105 instructs the buffer managing unit 107 to perform a notification when 20 bytes are available next, and the buffer managing unit 107 accords it. Accordingly, it is not necessary to vainly wait until a buffer is available.

To perform operations as above, it is possible to transmit arbitrary application data by the same communication connection as a communication connection to transmit data of the storage apparatus 13. Also, an embodiment is preferable where application data transmission request processing performed by the third application processing unit 401 is interfaced by a standard system call such as a send function implemented with Linux OS or the like and processing in this function is provided to be able to realize the above-described operations. By performing an interface with an application by such a standard function, an existing application needs not be changed, so that it is possible to ease an implementation of the present invention.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

At least part of the data transmission system explained in the above embodiments may be configured by hardware or software. In the case of configuring it by software, a program to realize at least part of functions of the data transmission system may be stored in a storage medium such as a flexible disc and CD-ROM, and may be realized by reading it by a computer. The storage medium is not limited to what is detachable such as a magnetic disc and an optical disc, and may be a fixed storage medium such as a hard disk apparatus and a memory.

Also, a program to realize at least part of the functions of the data transmission system may be distributed via a communication line (including wireless communication) such as the Internet. Further, this program is encrypted, modulated or compressed, and then distributed via a wired line or wireless line such as the Internet or stored in a storage medium for distribution.

The invention claimed is:

1. A data transferring apparatus that reads and transfers, file data stored in a storage apparatus that manages data in a block unit, comprising:
   circuitry configured to:
   receive a reading instruction of first file data based on first map information showing in which location on the storage apparatus the first file data is stored wherein the first map information is acquired by an external host CPU that receives metadata including the first map information and acquires the first map information by analyzing the metadata, and configured to generate a reading command of a block storing the first file data according to the reading command of the first file data, and send the reading command of the block to the storage apparatus; and
   receive block data read from the storage apparatus according to the reading command of the block, receive the first map information acquired by the external host CPU and, based on the first map information, extract the first file data from the block data;
   a communication circuit configured to transmit the extracted first file data.

2. The data transferring apparatus according to claim 1, being configured as a communication card.

3. The data transferring apparatus according to claim 1, wherein the circuitry is configured to, in response to an instruction from the external host CPU, generate a reading command of metadata including the first map information, and send the reading command of the metadata to the storage apparatus, wherein the external host CPU receives the metadata sent from the storage apparatus depending on the reading command of the metadata.

4. A data transmission system that reads and transmits file data stored in a storage apparatus that manages data in a block unit, the data transmission system comprising a CPU and a data transferring apparatus, wherein
   the CPU is configured to:
   generate a transmission instruction of first file data stored in the storage apparatus; and
   based on the transmission instruction, generate a reading instruction of metadata including first map information showing in which location on the storage apparatus the first file data is stored;
   the data transferring apparatus comprises circuitry configured to: based on the reading instruction of the metadata, generate a reading command of the metadata and send the reading command of the metadata to the storage apparatus;
   the CPU is configured to receive the metadata returned from the storage apparatus, acquire the first map information by analyzing the metadata, and generate a reading instruction of the first file data based on the first map information; and
   the circuitry of the data transferring apparatus is configured to:
   based on the reading instruction of the first file data, generate a reading command of a block storing the first file data and send the reading command to the storage apparatus;
   receive block data read from the storage apparatus according to the reading command and, based on the first map information, extract the first file data from the block data; and
   transmit the extracted first file data.

5. The data transmission system according to claim 4, wherein:
   the CPU is configured to:
   generate an acquisition instruction of second file data;
   generate, based on the acquisition instruction, a reading command of metadata including second map information showing in which location on the storage apparatus the second file data is stored, and send[s] the reading command to the storage apparatus;
   receive the metadata returned from the storage apparatus, acquire the second map information by analyzing the metadata, and generate a reading instruction of the second file data based on the second map information;

generate, based on the reading instruction of the second file data, a reading command of a block storing the second file data and send[s] the reading command to the storage apparatus; and receive block data read from the storage apparatus, extracts the second file data from the block data based on the second map information.

6. The data transmission system according to claim 4, wherein:

the CPU designates a connection for transmitting the first file data;

the circuitry has a buffer for each connection and buffers data extracted, to a buffer corresponding to a connection designated by the CPU;

the circuitry reads the data from the buffer in the data buffer and transmits the data;

the circuitry manages an availability state of the buffer corresponding to the designated connection; and the circuitry receives the transmission data reading instruction from the CPU, and generates a reading instruction for data of a size corresponding to the availability state which is not yet read in the first file data.

7. The data transmission system according to claim 6, wherein the CPU comprises wherein:

the CPU generates a transmission instruction of application data and designates a connection to transmit the application data wherein the application data exist on any apparatus different from the storage apparatus;

the circuitry manages an availability state of a buffer corresponding to a connection designated by the CPU;

the circuitry generates a writing permission signal for data of a size corresponding to the available state;

the CPU specifies data of the available size which is not yet written in the buffer in the application data, based on the writing permission signal, and writes the data in the buffer; and the circuitry reads data from the buffer corresponding to the connection and transmits the data.

8. The data transmission system according to claim 7, wherein the connection which the CPU designates to transmit the application data [a] is same as the connection which the CPU designates to transmit the first file data.

9. A data transmission method that reads and transmits file data stored in a storage apparatus that manages data in a block unit, comprising:

generating a transmission instruction of first file data stored in the storage apparatus;

generating based on the transmission instruction, a reading instruction of metadata including first map information showing in which location on the storage apparatus the first file data is stored;

generating a reading command of the metadata based on the reading instruction of the metadata and transmitting the reading command to the storage apparatus;

receiving metadata returned from the storage apparatus, the metadata including the first map information, and acquiring the first map information by analyzing the metadata, and generating a reading instruction of the first file data based on the first map information;

generating a reading command of a block storing the first file data, based on the reading command of the first file data, and transmitting the reading command of the block to the storage apparatus;

receiving block data read from the storage apparatus according to the reading command of the block and extracting the first file data from the block data based on the first map information; and transmitting the first file data.

10. A non-transitory computer readable medium having instructions stored therein which causes a computer to, in order to transfer file data stored in a storage apparatus that manages data in a block unit, execute steps comprising:

receiving a reading instruction of first file data based on first map information showing in which location on the storage apparatus the first file data is stored, the first map information being acquired by an external host CPU that receives metadata including the first map information and acquires the first map information by analyzing the metadata, generating a reading command of a block storing the first file data according to the reading command of the first file data, and sending the reading command of the block to the storage apparatus;

receiving block data read from the storage apparatus according to the reading command of the block, receiving the first map information acquired by the external host CPU and, based on the first map information, extracting the first file data from the block data; and transmitting the first file data as extracted.

* * * * *